W. H. MURREY.
Improvement in Cultivators.
No. 126,828. Patented May 14, 1872.
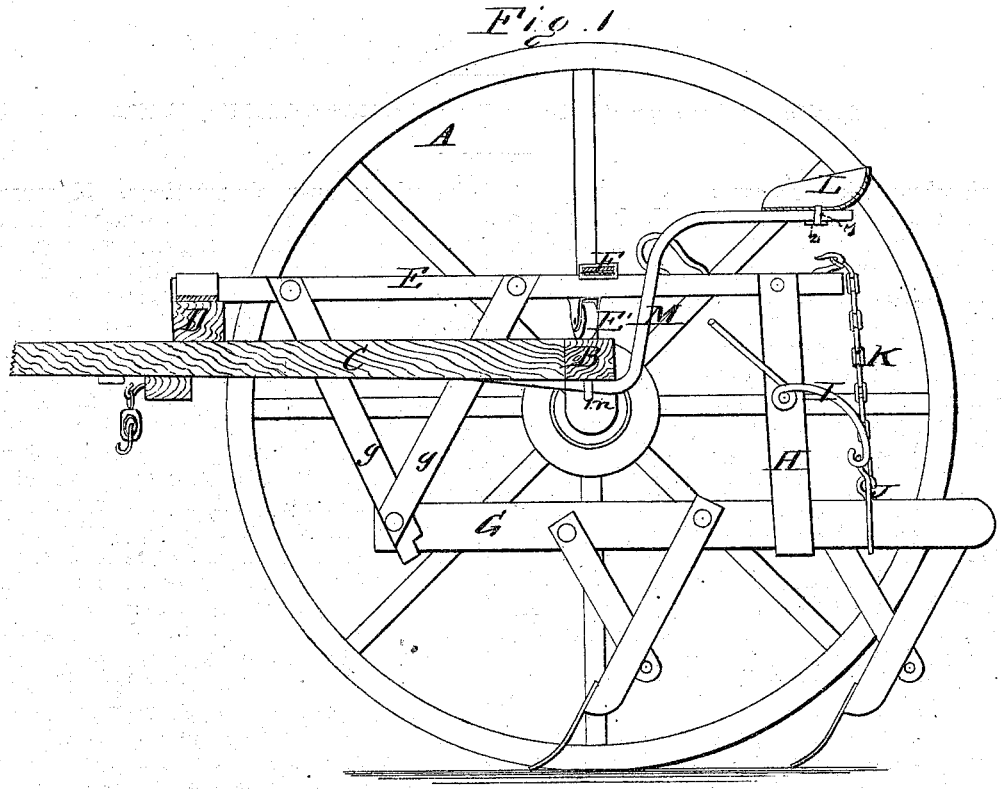
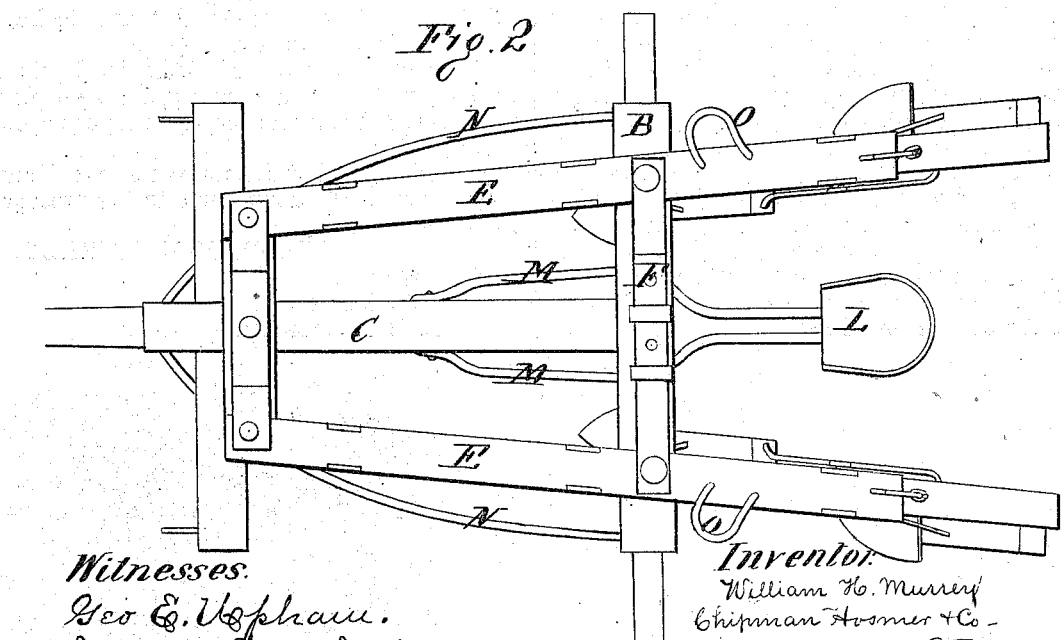
Witnesses:
Geo. E. Upham.
Edwin J. McLain.
Inventor:
William H. Murrey
Chipman Hosmer & Co.
Attys.

126,828

UNITED STATES PATENT OFFICE.

WILLIAM H. MURREY, OF BRODHEAD, WISCONSIN, ASSIGNOR OF ONE-HALF OF HIS RIGHT TO SAMUEL M. GOSLING, OF SAME PLACE.

IMPROVEMENT IN CULTIVATORS.

Specification forming part of Letters Patent No. 126,828, dated May 14, 1872.

*To all whom it may concern:*

Be it known that I, WILLIAM H. MURREY, of Brodhead, in the county of Green and State of Wisconsin, have invented a new and valuable Improvement in Cultivators; and I do hereby declare that the following is a full, clear, and exact description of the construction and operation of the same, reference being had to the annexed drawing making a part of this specification, and to the letters and figures of reference marked thereon.

Figure 1 of the drawing is a representation of a side elevation of my invention, with the near wheel removed. Fig. 2 is a top plan view of the same.

My invention has relation to sulky cultivators; and the novelty consists in the hereinafter described construction and arrangement of parts having reference to the supporting of the driver's seat, and the strength and security of the implement in general.

In the drawing, A represents the wheels of my improved sulky cultivator. B is the axle; C, the draft-pole secured to the axle; D, a transverse bar bolted to the draft-pole; E E, sway-bars hinged to the bar D; E', caster-wheels attached to the sway-bars and arranged to roll on the top of the axle to lessen friction. F is an extension-coupling, connecting the sway-bars. G are plow-beams, hinged at their forward ends to the diagonal stay-braces $g$, which are secured to the sway-bars. H represents stirrups or guides depending from the sway-bars, and supporting the rear ends of the plow-beams. I are foot-levers pivoted to the stirrups and attached to hooks or loops J which pass under the plow-beams. These levers are for the purpose of allowing the driver to raise the plows over obstructions. K represents chains connecting the plow-beams to the sway-bars and used in raising and supporting the plows from the ground when not in use. L represents the driver's seat, supported behind the axle by means of rods M bolted to the sides of the draft-pole, thence passing under the axle, and attached thereto by staples $m$. The rods M thence are bent up and extended rearward, as shown. In this position the rods serve as braces to the draft-pole, as well as supports for the driver's seat. A bolt, $y$, extends from the bottom of said seat, the lower end of which is firmly attached to a plate, $z$, which plate is bent upward at each end so as to clasp around the rods M, and not only serve to hold the seat securely, but permit it to be moved back and forth on such rods at will. The arrangement of said rods allows their elasticity sufficient freedom to render the driver's position comfortable. N represents the draft-pole and axle-braces, reaching from one to the other, as shown, and secured to the transverse bar D. O designates stirrups secured to the sway-bars, and used by the driver in spreading the latter.

What I claim as my invention, and desire to secure by Letters Patent, is—

The combination of the rods M, draft-pole C, axle B, staple $m$, seat L, bolt $y$, and bent plate $z$, substantially as and for the purpose specified.

In testimony that I claim the above I have hereunto subscribed my name in the presence of two witnesses.

WILLIAM H. MURREY.

Witnesses:
G. S. RAILIN,
C. N. CARPENTER.